United States Patent
Wang et al.

(10) Patent No.: US 8,655,655 B2
(45) Date of Patent: Feb. 18, 2014

(54) SOUND EVENT DETECTING MODULE FOR A SOUND EVENT RECOGNITION SYSTEM AND METHOD THEREOF

(75) Inventors: Yuh-Ching Wang, Tainan (TW); Kuo-Yuan Li, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 421 days.

(21) Appl. No.: 12/981,660

(22) Filed: Dec. 30, 2010

(65) Prior Publication Data

US 2012/0143610 A1    Jun. 7, 2012

(30) Foreign Application Priority Data

Dec. 3, 2010 (TW) .................................. 99142202

(51) Int. Cl.
*G10L 15/08* (2006.01)
*G10L 25/03* (2013.01)

(52) U.S. Cl.
USPC ........................... 704/237; 704/216; 704/239

(58) Field of Classification Search
CPC ......... G10L 15/08; G10L 25/00; G10L 25/03; G06K 9/00
USPC ......... 704/205, 213, 216, 217, 218, 219, 237, 704/238, 239
See application file for complete search history.

(56) References Cited

U.S. PATENT DOCUMENTS

| | | | |
|---|---|---|---|
| 4,166,980 A | 9/1979 | Apostolos et al. | |
| 4,450,436 A | 5/1984 | Massa | |
| 5,355,433 A | 10/1994 | Yasuda et al. | |
| 5,774,847 A * | 6/1998 | Chu et al. | 704/237 |
| 5,787,395 A | 7/1998 | Minamino | |
| 6,144,658 A | 11/2000 | Lebizay et al. | |
| 6,157,911 A | 12/2000 | Kuroda | |
| 6,314,392 B1 * | 11/2001 | Eberman et al. | 704/217 |
| 6,490,558 B1 | 12/2002 | Kahn et al. | |
| 6,502,067 B1 | 12/2002 | Hegger et al. | |

(Continued)

FOREIGN PATENT DOCUMENTS

| | | |
|---|---|---|
| TW | 323364 | 12/1997 |
| TW | 517221 | 1/2003 |

(Continued)

OTHER PUBLICATIONS

English language translation of abstract of TW 1305910 (published Feb. 1, 2009).

(Continued)

*Primary Examiner* — Martin Lerner
(74) *Attorney, Agent, or Firm* — McClure, Qualey & Rodack, LLP (57) ABSTRACT

A sound event detecting module for detecting whether a sound event with characteristic of repeating is generated. A sound end recognizing unit recognizes ends of sounds according to a sound signal to generate sound sections and multiple sets of feature vectors of the sound sections correspondingly. A storage unit stores at least M sets of feature vectors. A similarity comparing unit compares the at least M sets of feature vectors with each other, and correspondingly generates a similarity score matrix, which stores similarity scores of any two of the sound sections of the at least M of the sound sections. A correlation arbitrating unit determines the number of sound sections with high correlations to each other according to the similarity score matrix. When the number is greater than one threshold value, the correlation arbitrating unit indicates that the sound event with the characteristic of repeating is generated.

16 Claims, 10 Drawing Sheets

(56) References Cited

U.S. PATENT DOCUMENTS

| | | | |
|---|---|---|---|
| 6,542,869 B1* | 4/2003 | Foote | 704/500 |
| 6,631,349 B1* | 10/2003 | Ishiwatari et al. | 704/239 |
| 6,704,709 B1 | 3/2004 | Kahn et al. | |
| 6,829,582 B1* | 12/2004 | Barsness | 704/275 |
| 6,943,898 B2 | 9/2005 | Libinson et al. | |
| 7,085,724 B2* | 8/2006 | Den Brinker et al. | 704/500 |
| 7,284,004 B2* | 10/2007 | Cooper et al. | |
| 7,483,934 B1* | 1/2009 | Ide et al. | 708/422 |
| 7,551,834 B2* | 6/2009 | Kashino et al. | 386/343 |
| 7,640,218 B2* | 12/2009 | Cooper et al. | 706/20 |
| 7,689,559 B2* | 3/2010 | Canright et al. | |
| 7,783,106 B2* | 8/2010 | Cooper et al. | 382/173 |
| 7,921,120 B2* | 4/2011 | Podilchuk | 707/749 |
| 8,195,455 B2* | 6/2012 | Kim | 704/231 |
| 8,237,571 B2* | 8/2012 | Wang et al. | 340/573.1 |
| 2002/0133358 A1* | 9/2002 | Den Brinker et al. | 704/500 |
| 2003/0018479 A1* | 1/2003 | Oh et al. | 704/275 |
| 2003/0210402 A1 | 11/2003 | Libinson et al. | |
| 2004/0130449 A1* | 7/2004 | Hung | 340/573.1 |
| 2006/0080100 A1* | 4/2006 | Pinxteren et al. | 704/249 |
| 2006/0107216 A1* | 5/2006 | Cooper et al. | 715/724 |
| 2006/0173692 A1* | 8/2006 | Rao et al. | 704/503 |
| 2008/0235016 A1 | 9/2008 | Paul et al. | |
| 2009/0132252 A1* | 5/2009 | Malioutov et al. | 704/258 |
| 2010/0127878 A1* | 5/2010 | Wang et al. | 340/573.1 |
| 2012/0053929 A1* | 3/2012 | Hsia et al. | 704/9 |

FOREIGN PATENT DOCUMENTS

| | | |
|---|---|---|
| TW | 561452 | 11/2003 |
| TW | 567666 | 12/2003 |
| TW | I225638 | 12/2004 |
| TW | I245259 | 12/2005 |
| TW | I286738 | 9/2007 |
| TW | 200744067 | 12/2007 |
| TW | I299854 | 8/2008 |
| TW | I299855 | 8/2008 |
| TW | I300214 | 8/2008 |
| TW | I305910 | 2/2009 |
| TW | I312981 | 8/2009 |
| TW | I312982 | 8/2009 |
| TW | I314271 | 9/2009 |
| TW | I319152 | 1/2010 |
| TW | I319563 | 1/2010 |
| TW | 201015539 | 4/2010 |
| TW | I328798 | 8/2010 |
| WO | 2007059498 A2 | 5/2007 |

OTHER PUBLICATIONS

English language translation of abstract of TW 323364 (published Dec. 21, 1997).

English language translation of abstract of TW 517221 (published Jan. 11, 2003).

English language translation of abstract of TW 561452 (published Nov. 11, 2003).

English language translation of abstract of TW 567666 (published Dec. 21, 2003).

English language translation of abstract of TW I225638 (published Dec. 21, 2004).

English language translation of abstract of TW I245259 (published Dec. 11, 2005).

English language translation of abstract of TW I286738 (published Sep. 11, 2007).

English language translation of abstract of TW 200744067 (published Dec. 1, 2007).

English language translation of abstract of TW I299854 (published Aug. 11, 2008).

English language translation of abstract of TW I299855 (published Aug. 11, 2008).

English language translation of abstract of TW I300214 (published Aug. 21, 2008).

English language translation of abstract of TW I312981 (published Aug. 1, 2009).

English language translation of abstract of TW I312982 (published Aug. 1, 2009).

English language translation of abstract of TW I314271 (published Sep. 1, 2009).

English language translation of abstract of TW I319152 (published Jan. 1, 2010).

English language translation of abstract of TW I319563 (published Jan. 11, 2010).

English language translation of abstract of TW 201015539 (published Apr. 16, 2010).

English language translation of abstract of TW I328798 (published Aug. 11, 2010).

Wang, C.C.; "An Unusual Voice Detector Based on Nursing at Home;" pp. 1-35 , Jun. 2005.

Liu, K.C., et al; "Active Nursing Call Service with a Voice-Triggered Model;" pp. 1-3, Dec. 2009.

Zieger, C.; "An HMM Based System for Acoustic Event Detection;" pp. 1-7, 2008.

Zhuang, X., et al.; "Acoustic Fall Detection Using Gaussian Mixture Models and GMM Supervectors;" pp. 1-4 , Apr. 2009.

"Bellman Visit Baby-Cry Transmitter; BE 1290;" Technical Solutions Jun. 2005, pp. 10-12.

TW Office Action dated May 2, 2013.

* cited by examiner

| Sound event class | Continued duration (ms) | | High/low frequency energy ratio | | High energy band count | |
|---|---|---|---|---|---|---|
| | Minimum | Maximum | Average | Standard deviation | Average | Standard deviation |
| Sound of cry | 144 | 384 | 1.25 | 0.50 | 18.99 | 6.46 |
| Sound of groan | 240 | 1120 | 1.35 | 0.37 | 20.61 | 7.25 |
| Sound of help | 368 | 1472 | 1.55 | 0.14 | 13.98 | 3.99 |
| Telephone ring tone | 1088 | 1216 | 1.66 | 0.01 | 6.00 | 0.00 |

| Sound event class | Frequency range | | |
|---|---|---|---|
| | 0~500Hz | 500Hz~1000Hz | 1000Hz~2000Hz |
| Sound of cry | 0.3~0.85 | 3.5~7.92 | 16~44 |
| Sound of groan | 0.8~2.0 | 6.5~18.8 | 42~113 |

SOUND EVENT DETECTING MODULE FOR A SOUND EVENT RECOGNITION SYSTEM AND METHOD THEREOF

This application claims the benefit of Taiwan application Serial No. 99142202, filed Dec. 3, 2010, the subject matter of which is incorporated herein by reference.

BACKGROUND

1. Technical Field

The disclosure relates in general to a detecting module and a detecting method thereof, and more particularly to a sound event detecting module and a method thereof.

2. Description of the Related Art

The present sound detection technology is mostly applied to the speech recognition, and usually needs to use some training corpora to complete the sound recognition. In the practical application, however, it is impossible to incorporate the sounds of all possible users into the training corpora. Thus, if the user's sound is not incorporated into the training corpora, the success rate of recognition is significantly reduced.

The conventional speech recognition system performs the following recognition steps. First, the training corpora are collected, and parameter models are created. Then, the to-be-recognized sound section is compared with the parameter models to obtain a comparison score. Thereafter, a recognition result is generated according to the comparison score. In the above-mentioned steps, it is found that the speech recognition rate is significantly affected by the training corpora. The parameter models trained by different speakers may have the significant difference and thus affect the recognition rate. Thus, it is an important subject of the industry to reduce the influence of training corpora on the sound detection technology so that the sound detection technology can be applied to some application fields.

SUMMARY

The disclosure is directed to a sound event detecting module and a method thereof capable of detecting whether a sound event with the characteristic of repeating is generated.

In one exemplary embodiment, a sound event detecting module for detecting whether a sound event with the characteristic of repeating is generated is provided. The sound event detecting module includes a sound end recognizing unit, a storage unit, a similarity comparing unit and a correlation arbitrating unit. The sound end recognizing unit recognizes ends of sounds according to a sound signal to generate a plurality of sound sections and a plurality of sets of feature vectors of the sound sections correspondingly. The storage unit stores at least M sets of feature vectors of the sets of feature vectors, wherein M is a positive integer. The similarity comparing unit compares the at least M sets of feature vectors with each other, and generates a similarity score matrix correspondingly. The similarity score matrix stores similarity scores of any two of the sound sections. The correlation arbitrating unit determines the number of sound sections having high correlations to each other according to the similarity score matrix. When the number is greater than a threshold value, it is indicated that the sound event with the characteristic of repeating is generated.

In one exemplary embodiment, a sound event detection method for detecting whether a sound event with the characteristic of repeating is generated is provided. The method includes the following steps. Ends of sounds are recognized according to a sound signal to generate a plurality of sound sections and a plurality of sets of feature vectors of the sound sections correspondingly storing at least M sets of feature vectors of the sets of feature vectors, wherein M is a positive integer. The at least M sets of feature vectors are compared with each other and a similarity score matrix is generated correspondingly. The similarity score matrix stores similarity scores of any two of the sound sections. The number of sound sections having high correlations to each other is determined according to the similarity score matrix. When the number is greater than a threshold value, it is indicated that the sound event with the characteristic of repeating is generated.

The above and other aspects of the disclosure will become better understood with regard to the following detailed description of the non-limiting embodiment(s). The following description is made with reference to the accompanying drawings.

DETAILED DESCRIPTION

First Embodiment

Figure 1:
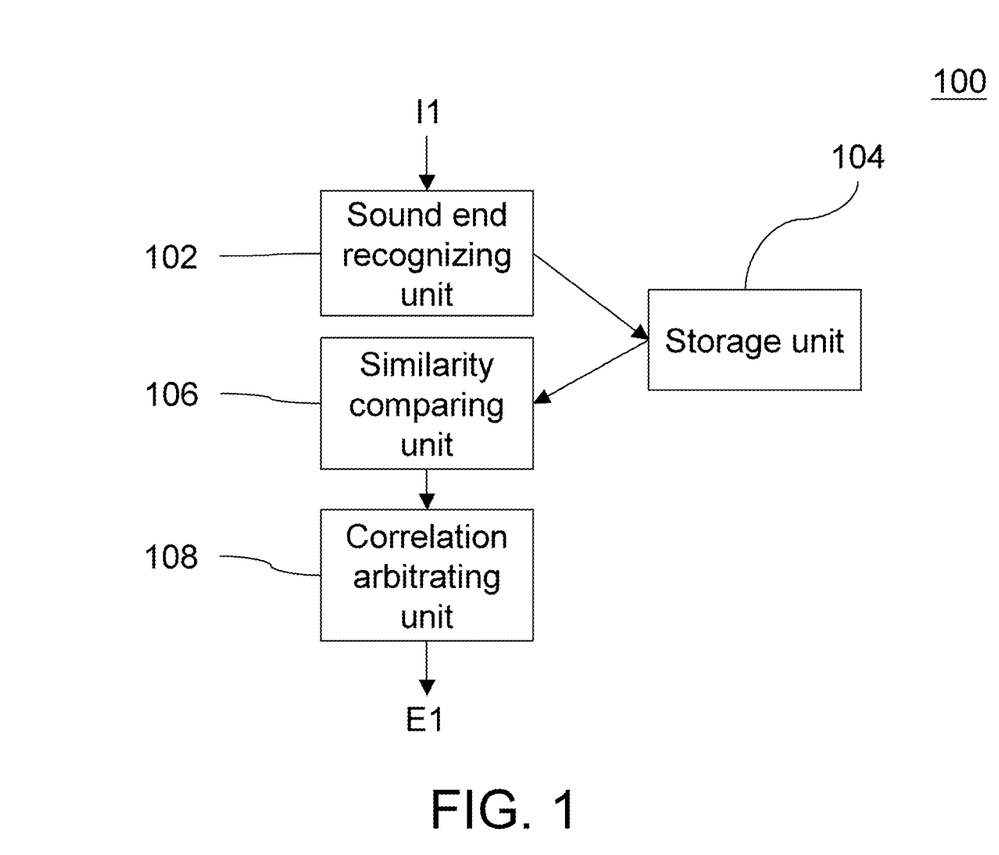
FIG. 1 is a schematic illustration showing a sound event detecting module according to a first embodiment of this disclosure.

FIG. 1 is a schematic illustration showing a sound event detecting module 100 according to a first embodiment of this disclosure. Referring to FIG. 1, the sound event detecting module 100 for detecting whether a sound event with the characteristic of repeating is generated includes a sound end recognizing unit 102, a storage unit 104, a similarity comparing unit 106 and a correlation arbitrating unit 108. The sound end recognizing unit 102 recognizes ends of sounds according to a sound signal 11 to generate sound sections and multiple sets of feature vectors of the sound sections correspondingly. The storage unit 104 stores at least M sets of feature vectors of the sets of feature vectors, wherein M is a positive integer. The similarity comparing unit 106 compares the at least M sets of feature vectors with each other and generates a similarity score matrix correspondingly. The similarity score matrix stores similarity scores of any two of the sound sections. The correlation arbitrating unit 108 performs arbitration to determine the number of sound sections having high correlations to each other according to the similarity score matrix. When the number is greater than a threshold value, it is indicated that a sound event E1 with the characteristic of repeating is generated.

The sound sections are, for example, continuous sound sections. The at least M sets of feature vectors are, for example, the feature vectors of at least M sound sections latest occurred. The storage unit 104 is implemented by, for example, a ring buffer, a first-in-first-out (FIFO) queue buffer or a PingPong buffer.

The multiple sets of feature vectors, generated by the sound end recognizing unit 102, include, Mel-scale frequency cepstral coefficients (MFCCs), for example. However, the embodiment is not limited thereto and may also use other types of feature vectors. Each set of feature vectors may have the MFCCs and further include other types of feature vectors.

The similarity comparing unit 106 may use at least one of a sound event template, a sound event statistics model, a sound event possibility model, a hidden Markov model and a neural network to compare the sets of feature vectors with each other. The comparing method for the sound event template may be, for example, a dynamic time warping (DTW) method. The DTW method can consider the speed variation of generating the sound event and perform the proper compensation upon comparison. The sound event statistics model or sound event possibility model is, for example, a Gaussian mixture model. However, this embodiment is not restricted thereto, and other types of comparing methods may be performed.

Figure 2:
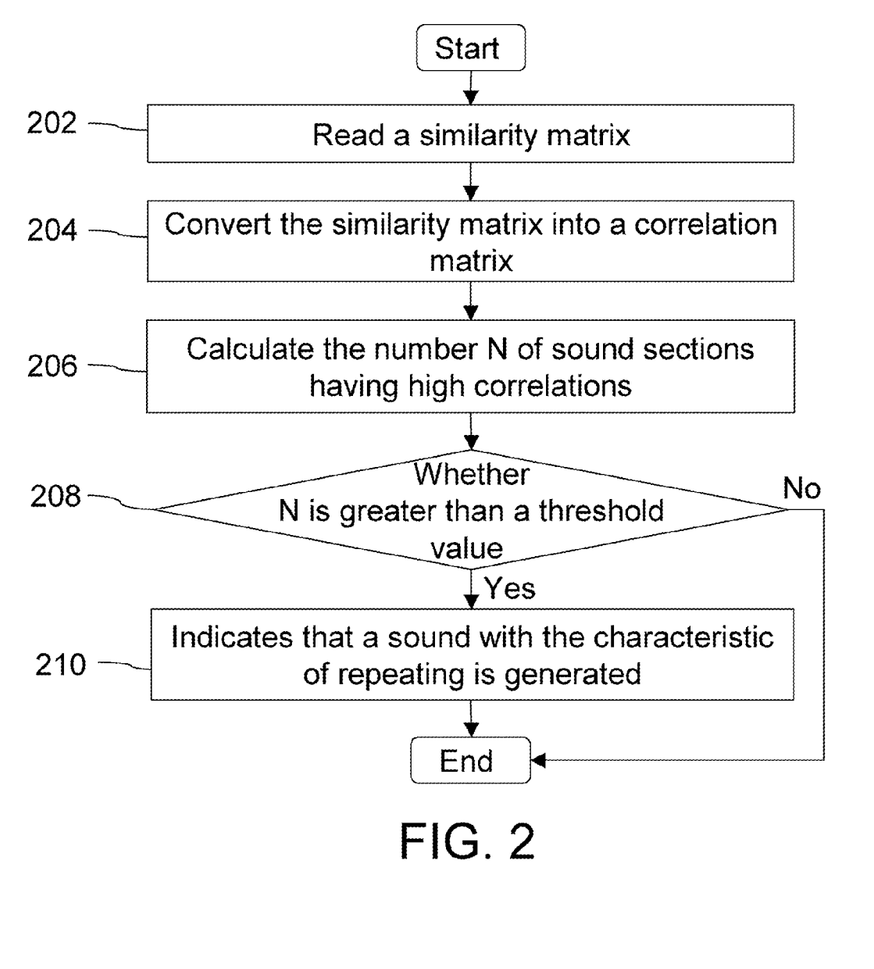
FIG. 2 is a flow chart showing a correlation arbitrating operation executed by the correlation arbitrating unit of FIG. 1 in one example.

FIG. 2 is a flow chart showing a correlation arbitrating operation executed by the correlation arbitrating unit 108 of FIG. 1 in one example. First, as shown in step 202, a similarity matrix is read. Next, as shown in step 204, the similarity matrix is converted into a correlation matrix. Thereafter, as shown in step 206, the number of sound sections N having high correlations to each other is calculated. Then, as shown in step 208, whether N is greater than the set threshold value is determined. If yes, step 210 is entered, and the correlation arbitrating unit 108 indicates that the sound event E1 with the characteristic of repeating is generated. The correlation arbitrating unit 108 outputs, for example, an indication signal to indicate the generation of the sound event E1 with the characteristic of repeating. Alternatively, the correlation arbitrating unit 108 directly indicates the generation of the sound event E1 with the characteristic of repeating by outputting the sound event E1 with the characteristic of repeating.

Figure 3:
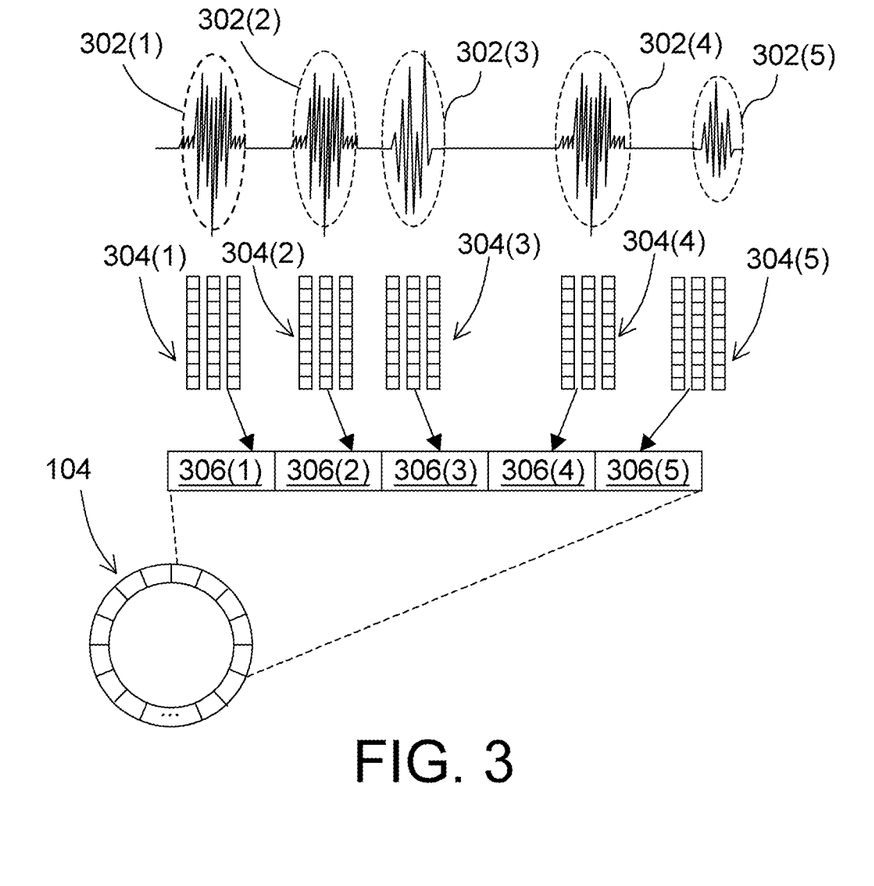
FIG. 3 is a partially schematic illustration showing an example when the sound event detecting module of FIG. 1 is operating.

FIG. 3 is a partially schematic illustration showing an example when the sound event detecting module 100 of FIG. 1 is operating. It is assumed that the sound end recognizing unit 102 recognizes ends of sounds on the sound signal 11, and generates five sound sections 302(1) to 302(5) correspondingly. It is assumed that the sound sections 302(1), 302(2), 302(4) are repeated audio sections or similar audio sections. The sound end recognizing unit 102 also generates five sets of feature vectors 304(1) to 304(5) corresponding to the sound sections 302(1) to 302(5), and stores the feature vectors 304(1) to 304(5) to five storages 306(1) to 306(5) of the storage unit 104 implemented by the ring buffer, the FIFO queue buffer, the PingPong buffer or the like.

Figure 4:
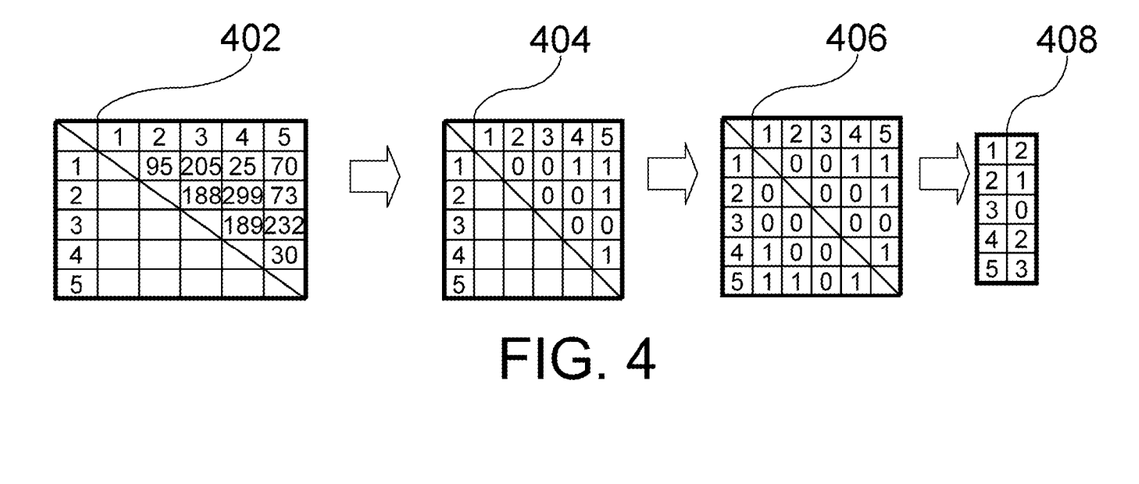
FIG. 4 shows an example of a similarity score matrix generated by the similarity comparing unit of FIG. 1, and an example of multiple matrixes generated by the correlation arbitrating unit.

FIG. 4 shows an example of a similarity score matrix generated by the similarity comparing unit 106 of FIG. 1, and an example of multiple matrixes generated by the correlation arbitrating unit 108. It is assumed that the similarity comparing unit 106 uses the DTW to generate multiple DTW distances according to the feature vectors 304(1) to 304(5). In a similarity score matrix 402, the first row of digits 1 to 5 respectively represent the sound sections 302(1) to 302(5), and the first column of digits 1 to 5 also respectively represent the sound sections 302(1) to 302(5). The content of the element Mx[i, j] of the $(i+1)^{th}$ row and the $(j+1)^{th}$ column of the similarity score matrix 402 represents the DTW distance between the sound section 302($i$) and the sound section 302($j$). The smaller DTW distance represents the higher similarity. The correlation arbitrating unit 108 converts the similarity score matrix 402 into a correlation matrix 404, for example. The content value corresponding to the correlation matrix 404 is set to 1 when the DTW distance is smaller than a threshold value TH1, which is assumed to be 80; or otherwise is set to 0. That is, the corresponding element S[i, j] of the correlation matrix 404 is set to 1 when Mx[i, j]≤TH1; or otherwise is set to 0. Thereafter, the correlation arbitrating unit 108 mirrors the correlation matrix 404 and then adds the mirrored correlation matrix 404 to the correlation matrix 404 to generate an adjusted correlation matrix 406, in which S[i, j] is equal to S[j, i]. When i=j, the same sound section is detected and no comparison is made.

Then, the correlation arbitrating unit 108 calculates the sum of each row (i.e., equal to the number of "1" in each row) in the adjusted correlation matrix 406 to generate a matrix 408. In the matrix 408 of this example, the content value corresponding to the sound section 302(5) has the maximum (equal to 3), which represents that there are three sound sections having high correlations with the sound section 302(5). Therefore, after 1 is added to the content value, the number N of the sound sections with the high correlations to each other in all the sound sections may be obtained. That is, N is equal to 4.

Then, the correlation arbitrating unit 108 performs arbitration to determine whether N is greater than the set threshold value, and the threshold value is assumed to be TH2 (equal to 2). Because N is greater than the threshold value TH2, the correlation arbitrating unit 108 determines that the sound event E1 with the characteristic of repeating is generated.

Figure 5:
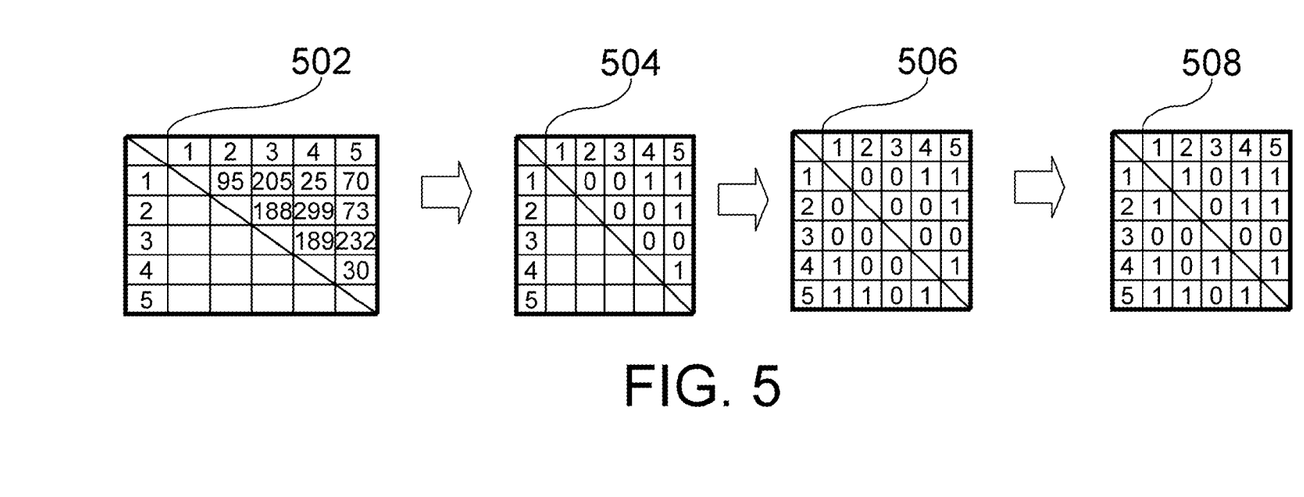
FIG. 5 shows another example of a similarity score matrix generated by the similarity comparing unit of FIG. 1, and another example of multiple matrixes generated by the correlation arbitrating unit.

FIG. 5 shows another example of a similarity score matrix generated by the similarity comparing unit 106 of FIG. 1, and another example of multiple matrixes generated by the correlation arbitrating unit 108. In the example of FIG. 5, the methods of generating a similarity score matrix 502, a correlation matrix 504 and an adjusted correlation matrix 506 are respectively the same as those of generating the similarity score matrix 402, correlation matrix 404 and the adjusted correlation matrix 406 of FIG. 4, so detailed descriptions thereof will be omitted. The correlation arbitrating unit 108 again generates an adjusted correlation matrix 508, finds two indirectly correlated sound sections i and j (i.e., i and j satisfying S[i, k]=1 and S[k, j]=1), and then sets the element S'[i, j] of the adjusted correlation matrix 508 to be 1. For example, S'[1, 2] is set to 1. Next, the number of sound sections having high correlations to each other is calculated by firstly summing the content values of all elements of the re-adjusted correlation matrix 508 to obtain a sum, then dividing the sum by the number M of sound sections minus 1 (i.e., Sum/(M−1)), and finally takes the quotient of Sum/(M−1) plus 1 to obtain the number of the sound sections having the high correlations to each other. In this example, the sum of the content values of all the elements of the correlation matrix 508 is 12, M−1=5−1=4, 12 is divided by 4 to obtain the quotient of 3, and 3+1=4. It is obtained that the number N of the sound sections having the high correlations to each other in all the sound sections is equal to 4.

Figure 6:
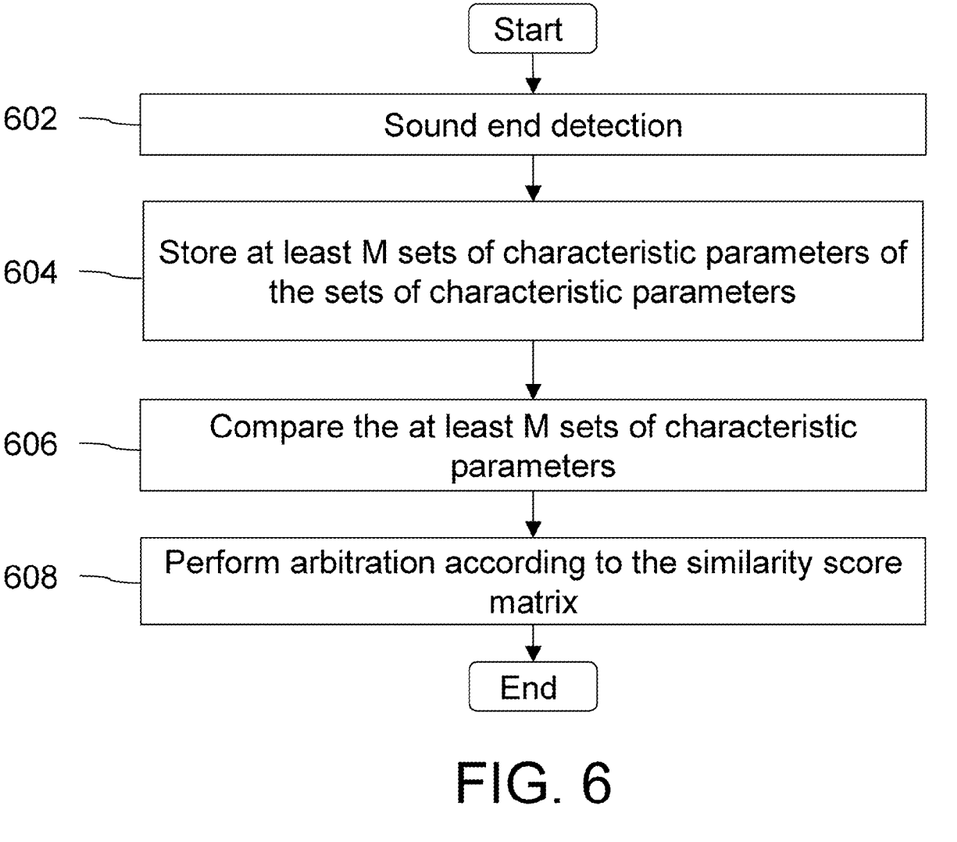
FIG. 6 is a flow chart showing a sound event detection method according to the first embodiment.

This embodiment further proposes a sound event detection method for detecting whether the sound event with the characteristic of repeating is generated. FIG. 6 is a flow chart showing the sound event detection method according to the first embodiment. First, step 602 is performed to recognize ends of sounds according to a sound signal to generate sound sections and multiple sets of feature vectors of these sound sections correspondingly. Next, step 604 is performed to store at least M sets of feature vectors of the sets of feature vectors, wherein M is a positive integer. Thereafter, step 606 is performed to compare the at least M sets of feature vectors with each other and generate a similarity score matrix correspondingly. The similarity score matrix stores similarity scores of any two of the sound sections. Then, step 608 is performed to determine the number of sound sections having high correlations to each other according to the similarity score matrix. When the number is greater than a threshold value, it indicates that the sound event with the characteristic of repeating is generated.

This embodiment detects whether the sound event with the characteristic of repeating is generated according to the property that the sound characteristics may be similar to each other because the continuous sound sections may come from the same speaker. When the continuous sound sections have a predetermined ratio of sound section similarity, the generation of the sound event with the characteristic of repeating can be determined. This embodiment can basically complete the sound detection without the statistics model or training corpus to reduce the influence of the reduced recognition rate caused by the conventional training corpus. This embodiment performs the sound event detection according to the feature that the same user has the same property of sound, and thus could effectively enhance the recognition rate.

This embodiment is adapted to the occasion where the repeated, similar sound events may occur. For example, this embodiment may be applied to the assistant home care. When a home member to be cared outputs the sound, such as the sound of cough, the sound of asthma, the sound of help or the like, which may be repeatedly outputted, this embodiment can detect the generation of the repeated sound to be noted and notify the caretaker in the care center. Thus, the caretaker can rapidly obtain the condition of the to-be-cared member and thus can rapidly perform the associated process. Thus, the caretaker may not need to stay around the to-be-cared member for a long time, and the loading of the caretaker and the care cost can be decreased.

When this embodiment is applied to the assistant home care, the sound event with the characteristic of repeating may be the sound of help, the sound of cry, the sound of groan, the sound of cough or the sound of asthma. However, this embodiment is not restricted thereto as long as the sound event with the characteristic of repeating may assist the home care.

In addition, this embodiment is not restricted to the application of the assistant home care as long as the sound event with the characteristic of repeating is helpful to this application.

Second Embodiment

Figure 7:
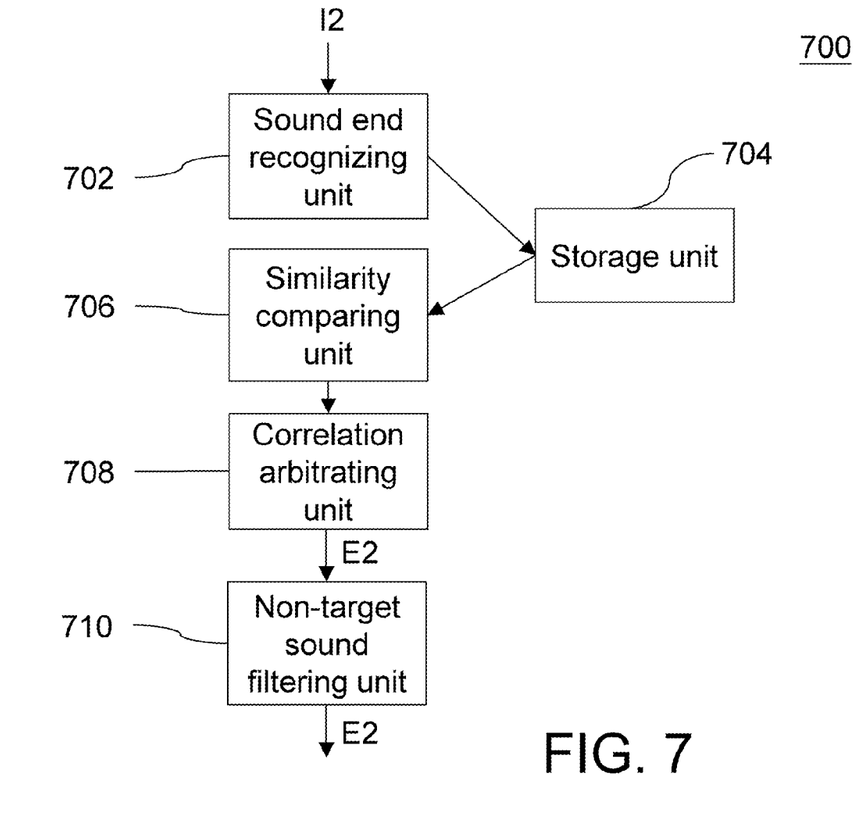
FIG. 7 is a schematic illustration showing a sound event detecting module according to a second embodiment of this disclosure.

FIG. 7 is a schematic illustration showing a sound event detecting module 700 according to a second embodiment of this disclosure. Referring to FIG. 7, the sound event detecting module 700 includes a sound end recognizing unit 702, a storage unit 704, a similarity comparing unit 706, a correlation arbitrating unit 708 and a non-target sound filtering unit 710. The sound end recognizing unit 702 recognizes ends of sounds according to a sound signal I2 to generate multiple sound sections and multiple sets of feature vectors of the sound sections correspondingly. The storage unit 704 stores at least M sets of feature vectors of the sets of feature vectors. The similarity comparing unit 706 compares the at least M sets of feature vectors with each other, and generates a similarity score matrix correspondingly. The similarity score matrix stores similarity scores of any two of the sound sections. The correlation arbitrating unit 708 performs arbitration to determine the number of sound sections having high correlations to each other according to the similarity score matrix. When the number is greater than a threshold value, it is indicated that a sound event E2 with the characteristic of repeating is generated.

The non-target sound filtering unit 710 determines whether to ignore the sound event E2 with the characteristic of repeating according to the sets of feature vectors. If the non-target sound filtering unit 710 determines that the sound event E2 needs not to be ignored, then the non-target sound filtering unit 710 outputs the sound event E2 with the characteristic of repeating; or otherwise the non-target sound filtering unit 710 does not output the sound event E2 with the characteristic of repeating.

If this embodiment is applied to the assistant home care, the home environment may have some non-target sound events, such as the telephone ring tone, the background sound, the environment noise and the like, which are repeated and are not to be detected. This embodiment uses the non-target sound filtering unit 710 to determine whether the sound event E2 with the characteristic of repeating is generated by the correlation arbitrating unit 708, is the non-target sound event (e.g., the telephone ring tone, the background sound, the environment noise or the like), which is not to be detected. Thus, the recognition rate of the sound event detecting module 700 can be further enhanced.

Figure 8:
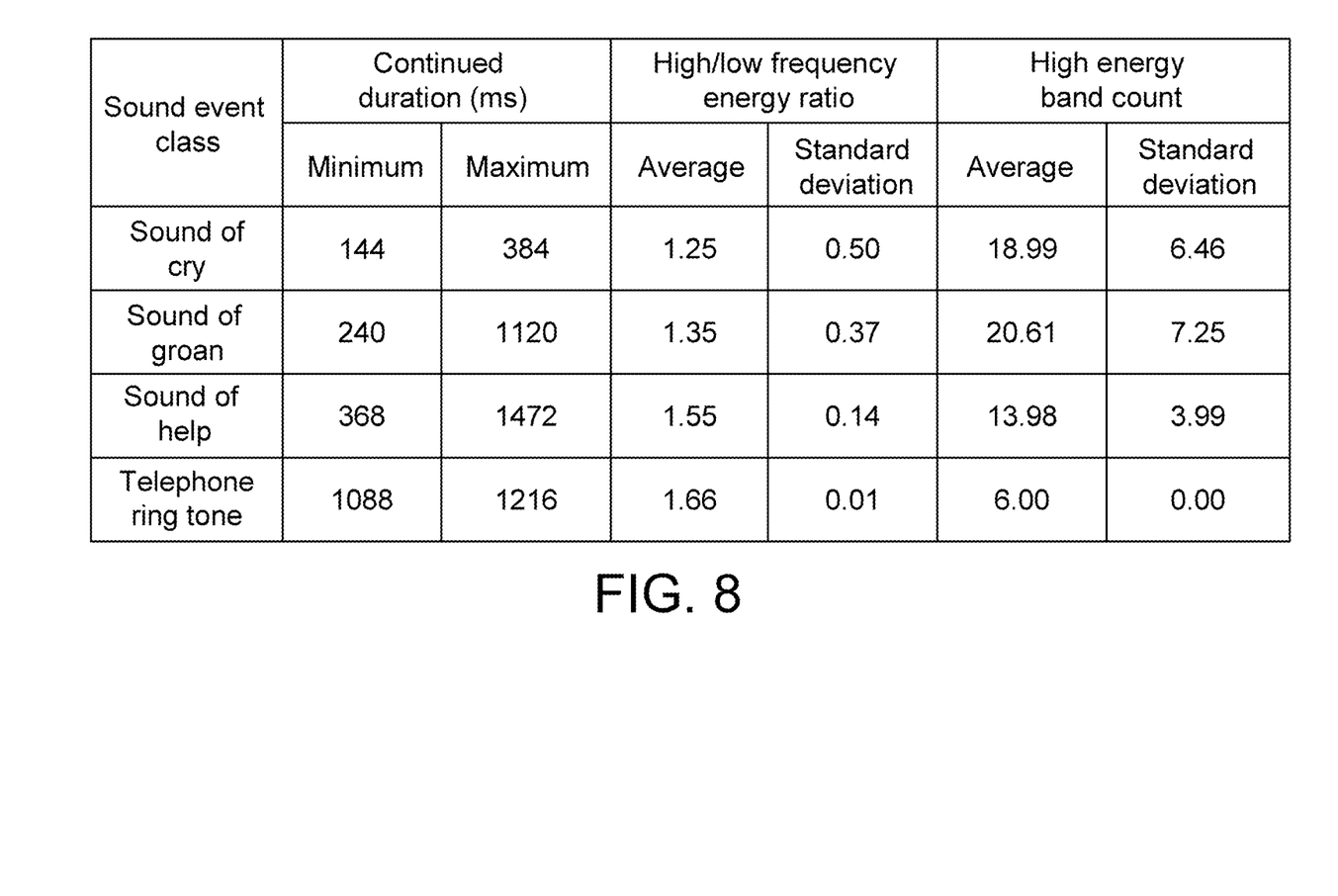
FIG. 8 shows an example of actual statistical data of various sound events and various sound characteristics.

An example will be described in the following. FIG. 8 shows an example of actual statistical data of various sound events and various sound characteristics. In the table of FIG. 8, the continued duration, the high/low frequency energy ratio and the high energy band count corresponding to the sound of cry, the sound of groan, the sound of help, and the telephone ring tone are listed. In the practical application, it is possible to distinguish the non-target sound event from the target sound event and design the corresponding filter-out determining condition with reference to the contents of the table of FIG. 8 according to the non-target sound events to be filtered out.

Regarding the continued duration, for example, the substantial range of the continued duration of the sound of cry, the sound of groan and the sound of help can be obtained according to the experimental result. Thus, it is possible to determine that any sound falling out of the range is the non-target sound event. This method is adapted to the filtering of the repeated background sound event with the short or long continued duration.

Regarding the high/low frequency energy ratio (e.g., the ratio of the energy with the frequency lower than 1000 Hz to the energy with the frequency higher than 1000 Hz), the range of the high/low frequency energy ratio of the sound of cry, the sound of groan and the sound of help can be obtained according to the experimental result. Thus, it is possible to determine that any sound event falling out of the range is the non-target sound event. This method is adapted to the filtering of the repeated background sound event with the energy especially concentrated at the low frequency or high frequency.

Regarding the high energy band count, the high energy band count can be generated as follows, for example. The frequency bands of the frequency domains of the sound signals are sorted according to the energy level. P frequency bands with larger energy level are selected. P is integer. The sum of the energy of the P frequency bands is larger than 70% of the total energy of all frequency bands. The minimum value of P is selected as the high energy band count. The range of the high energy band count of the sound of cry, the sound of groan and the sound of help may be obtained according to the experimental result. That is, the energy concentration extent thereof may be obtained. Thus, it is possible to determine that any sound event falling out of the range is the non-target sound event. This method is adapted to the filtering of the repeated background sound event, such as the telephone ring tone, with the energy especially concentrated at the some frequency band.

To achieve the function of filtering out the non-target sound, the sets of feature vectors generated by the sound end recognizing unit 702 may further include other parameters, such as the sound section length, the zero crossing rate, the energy of the specific frequency range, and the frequency range of main energy. For example, the sets of feature vectors generated by the sound end recognizing unit 702 may include the MFCC, and further include the parameters, such as the sound section length, the zero crossing rate, the energy of the specific frequency range and the frequency range of main energy, to facilitate the non-target sound filtering unit 710 in obtaining the continued duration, the high/low frequency energy ratio, the high energy band count of the sound event, and the like. However, this embodiment is also not restricted thereto, and the required feature vectors may be determined according to the practical application.

Third Embodiment

Figure 9:
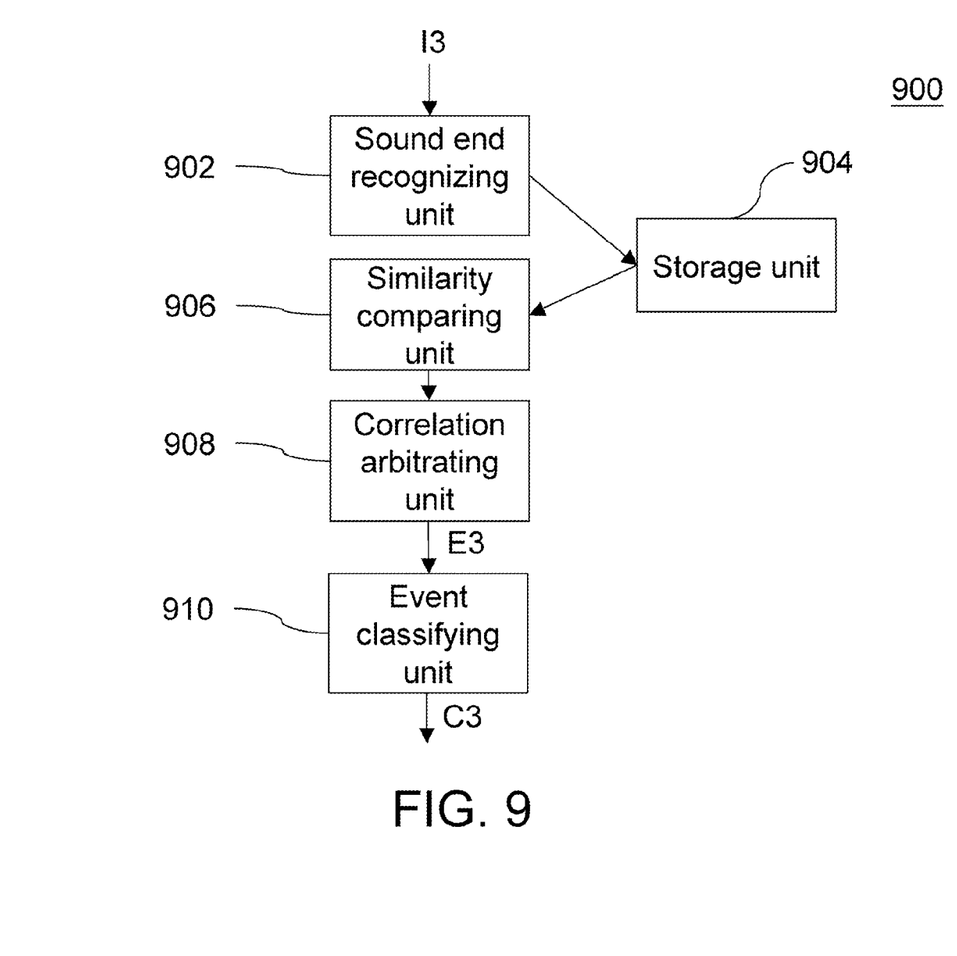
FIG. 9 is a schematic illustration showing a sound event detecting module according to a third embodiment of this disclosure.

FIG. 9 is a schematic illustration showing a sound event detecting module 900 according to a third embodiment of this disclosure. Referring to FIG. 9, the sound event detecting module 900 includes a sound end recognizing unit 902, a storage unit 904, a similarity comparing unit 906, a correlation arbitrating unit 908 and an event classifying unit 910. The sound end recognizing unit 902 recognizes ends of sounds according to a sound signal 13 to generate sound sections and sets of feature vectors of the sound sections correspondingly. The storage unit 904 stores at least M sets of feature vectors of the sets of feature vectors. The similarity comparing unit 906 compares the at least M sets of feature vectors with each other, and generates a similarity score matrix correspondingly. The similarity score matrix stores similarity scores of any two of the sound sections. The correlation arbitrating unit 908 performs arbitration to determine the number of sound sections having high correlations to each other according to the similarity score matrix. When the number is greater than a threshold value, it is indicated that a sound event E3 with the characteristic of repeating is generated. The event classifying unit 910 classifies the sound event E3 with the characteristic of repeating according to the sets of feature vectors corresponding to the sound event E3 with the characteristic of repeating.

For example, when this embodiment is applied to the assistant home care and detects the generation of the sound event E3 with the characteristic of repeating the event classifying unit 910 classifies the sound event E3 with the characteristic of repeating and then outputs a class indication signal C3 indicating the class of the sound event E3. For example, the class indication signal C3 indicates that the sound event E3 is the sound of help, the sound of cry, the sound of groan, the sound of cough or the sound of asthma.

To achieve the classifying function, each of the sets of feature vectors may include at least one of the Mel-scale frequency cepstral coefficient, the cepstrum, the linear prediction coefficient, the linear spectral pair, the energy of the specific frequency range, the frequency range of the main energy, the high/low frequency energy ratio, the sound section length, the zero crossing rate and the sound energy, so that the event classifying unit 910 performs the classification according to the property of the sound event E3 with the characteristic of repeating.

Figure 10:
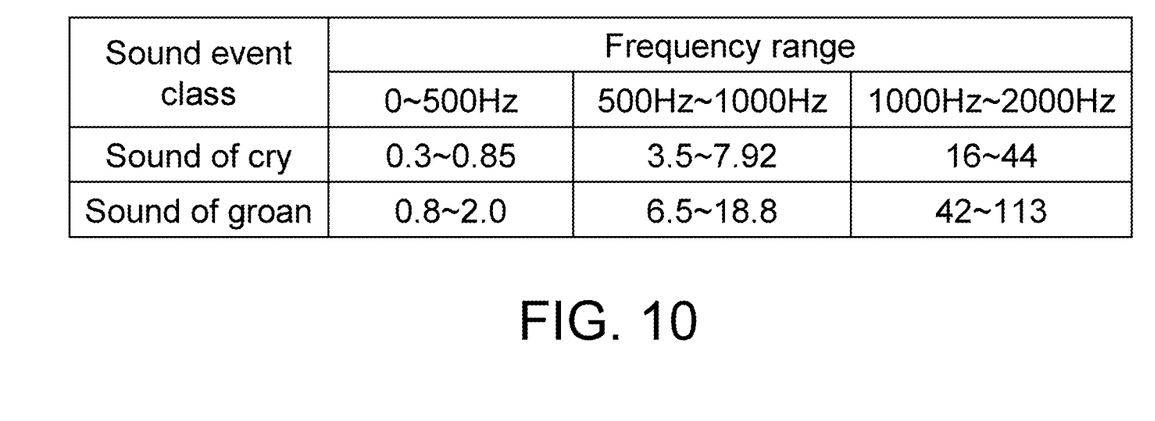
FIG. 10 shows an example of experimental data of two sound events and sound characteristics.

One example will be described in the following. FIG. 10 shows an example of experimental data of two sound events and sound characteristics. According to the experimental data of FIG. 10, it is found that the sound of cry and the sound of groan have different energy intensities within different frequency ranges. Thus, the classification can be performed according to this property to determine which class of sound events the sound event E3 pertains in order to perform the classification.

Fourth Embodiment

Figure 11:
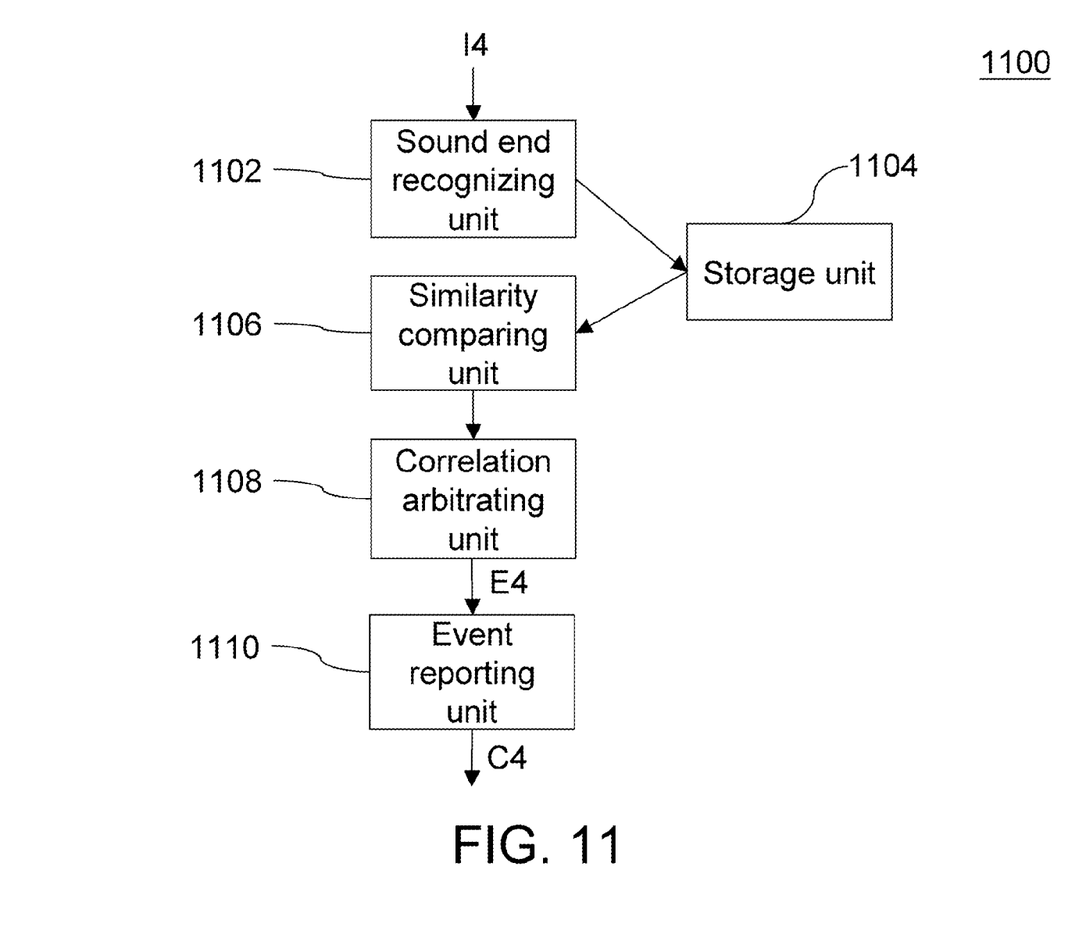
FIG. 11 is a schematic illustration showing a sound event detecting module according to a fourth embodiment of this disclosure.

FIG. 11 is a schematic illustration showing a sound event detecting module 1100 according to a fourth embodiment of this disclosure. Referring to FIG. 11, the sound event detecting module 1100 includes a sound end recognizing unit 1102, a storage unit 1104, a similarity comparing unit 1106, a correlation arbitrating unit 1108 and an event reporting unit 1110. The sound end recognizing unit 1102 recognizes ends of sounds according to a sound signal I4 to generate sound sections and multiple sets of feature vectors of the sound sections correspondingly. The storage unit 1104 stores at least M sets of feature vectors of the sets of feature vectors. The similarity comparing unit 1106 compares the at least M sets of feature vectors with each other, and generates a similarity score matrix correspondingly. The similarity score matrix stores similarity scores of any two of the sound sections. The correlation arbitrating unit 1108 performs arbitration to determine the number of sound sections having high correlations to each other according to the similarity score matrix. When the number is greater than a threshold value, it is indicated that a sound event E4 with the characteristic of repeating is generated. When the sound event E4 with the characteristic of repeating is generated, the event reporting unit 1110 executes at least one of a reporting function, a warning function, a reminding function and the like. For example, the event reporting unit 1110 outputs a reporting signal C4 to indicate that the sound event E4 with the repeated property is generated.

When this embodiment is applied to the assistant home care, the event reporting unit 1110 can notify the caretaker in the care center upon detection of the repeated sound to be noted, so that the caretaker can rapidly obtain the condition of the to-be-cared member and perform the associated process.

The above-mentioned disclosure may also be applied to the environment, in which the repeated sound may be generated, such as the sound detection of the mechanical failure or the like.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sound event detecting module of a sound event recognition system for detecting whether a sound event with the characteristic of repeating is generated, the module comprising:
    a sound end recognizing unit executed by the sound event recognition system for recognizing ends of sounds according to a sound signal to generate a plurality of sound sections and a plurality of sets of feature vectors of the sound sections correspondingly;
    a storage unit for storing at least M sets of feature vectors of the sets of feature vectors, wherein M is a positive integer;
    a similarity comparing unit executed by the sound event recognition system for comparing the at least M sets of feature vectors with each other, and generating a similarity score matrix correspondingly, wherein the similarity score matrix stores similarity scores of any two of the sound sections; and
    a correlation arbitrating unit executed by the sound event recognition system for converting the similarity score matrix into a correlation matrix that contains only values of 0 or 1, and for calculating the sum of each row of the correlation matrix to obtain the number of sound sections having high correlations to each other, wherein when the number is greater than a threshold value, it is indicated that the sound event with the characteristic of repeating is generated.

2. The sound event detecting module according to claim 1, wherein the sound event with the characteristic of repeating comprises at least one of a sound of help, a sound of cry, a sound of groan, a sound of cough and a sound of asthma.

3. The sound event detecting module according to claim 1, wherein the similarity comparing unit uses at least one of a sound event template, a sound event statistics model, a sound event possibility model, a hidden Markov model and a neural network to compare the sets of feature vectors with each other.

4. The sound event detecting module according to claim 1, further comprising a non-target sound filtering unit for determining whether to ignore the sound event with the characteristic of repeating according to the sets of feature vectors, wherein each of the sets of feature vectors comprises at least one of a sound section length, a zero crossing rate, energy of a specific frequency range and a frequency range of main energy.

5. The sound event detecting module according to claim 1, further comprising an event classifying unit for classifying the sound event with the characteristic of repeating according to the sets of feature vectors corresponding to the sound event with the characteristic of repeating wherein each of the sets of feature vectors comprises at least one of a Mel-scale frequency cepstral coefficient, a cepstrum, a linear prediction coefficient, a linear spectral pair, energy of a specific frequency range, a frequency range of main energy, a high/low frequency energy ratio, a sound section length, a zero crossing rate and sound energy.

6. The sound event detecting module according to claim 1, further comprising an event reporting unit for executing at least one of a reporting function, a warning function and a reminding function when the sound event with the characteristic of repeating is generated.

7. The sound event detecting module according to claim 1, wherein the sound sections are continuous sound sections, the at least M sets of feature vectors are feature vectors of at least M sound sections latest occurred, and the correlation arbitrating unit further outputs the sound event with the characteristic of repeating.

8. The sound event detecting module according to claim 1, wherein the storage unit is implemented by a ring buffer, a first-in-first-out (FIFO) queue buffer or a PingPong buffer.

9. A sound event detection method adapted to a sound event recognition system for detecting whether a sound event with the characteristic of repeating is generated, the method comprising the steps of:
    recognizing, by the sound event recognition system, ends of sounds according to a sound signal to generate a plurality of sound sections and a plurality of sets of feature vectors of the sound sections correspondingly;
    storing, by the sound event recognition system, at least M sets of feature vectors of the sets of feature vectors, wherein M is a positive integer;
    comparing, by the sound event recognition system, the at least M sets of feature vectors with each other and generating a similarity score matrix correspondingly, wherein the similarity score matrix stores similarity scores of any two of the sound sections;
    converting, by the sound event recognition system, the similarity score matrix into a correlation matrix that contains only values of 0 or 1; and
    calculating, by the sound event recognition system, the sum of each row of the correlation matrix to obtain the number of sound sections having high correlations to each other, wherein when the number is greater than a threshold value, it is indicated that the sound event with the characteristic of repeating is generated.

10. The method according to claim 9, wherein the sound event with the characteristic of repeating comprises at least one of a sound of help, a sound of cry, a sound of groan, a sound of cough and a sound of asthma.

11. The method according to claim 9, wherein the step of comparing uses at least one of a sound event template, a sound event statistics model, a sound event possibility model, a hidden Markov model and a neural network.

12. The method according to claim 9, further comprising the step of:
    determines whether to ignore the sound event with the characteristic of repeating according to the sets of feature vectors, wherein each of the sets of feature vectors comprises at least one of a sound section length, a zero crossing rate, energy of a specific frequency range and a frequency range of main energy.

13. The method according to claim 9, further comprising the step of:
    classifying the sound event with the characteristic of repeating according to the sets of feature vectors corresponding to the sound event with the characteristic of repeating wherein each of the sets of feature vectors comprises at least one of a Mel-scale frequency cepstral coefficient, a cepstrum, a linear prediction coefficient, a linear spectral pair, energy of a specific frequency range, a frequency range of main energy, a high/low frequency energy ratio, a sound section length, a zero crossing rate and sound energy.

14. The method according to claim 9, further comprising the step of:

executing at least one of a reporting function, a warning function and a reminding function when the sound event with the characteristic of repeating is generated.

15. The method according to claim 9, wherein the sound sections are continuous sound sections, the at least M sets of feature vectors are feature vectors of at least M sound sections latest occurred, and the method further comprises the step of:
outputting the sound event with the characteristic of repeating.

16. The method according to claim 9, wherein the at least M sets of feature vectors are stored in a ring buffer, a FIFO queue buffer or a PingPong buffer.

\* \* \* \* \*